April 17, 1934.  H. F. BUSHONG  1,955,698
FREEWHEELING TRANSMISSION
Filed March 5, 1931   2 Sheets-Sheet 1

INVENTOR.
Harry F Bushong
BY
ATTORNEY.

April 17, 1934.　　　H. F. BUSHONG　　　1,955,698
FREEWHEELING TRANSMISSION
Filed March 5, 1931　　2 Sheets-Sheet 2
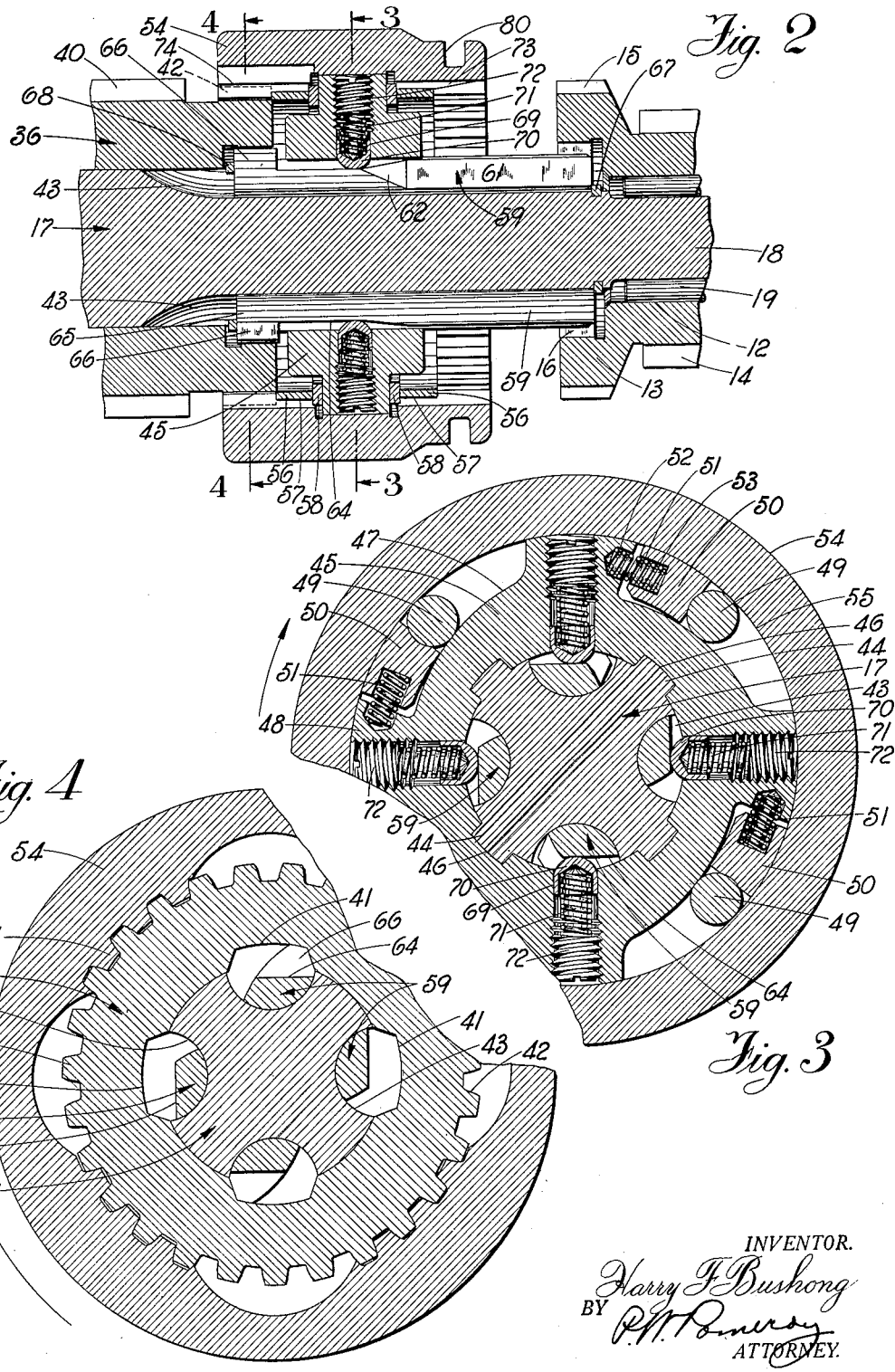
INVENTOR.
Harry F. Bushong
BY
ATTORNEY.

Patented Apr. 17, 1934

1,955,698

UNITED STATES PATENT OFFICE 1,955,698

FREEWHEELING TRANSMISSION

Harry F. Bushong, South Bend, Ind., assignor, by mesne assignments, to Free Wheeling Patents Corporation, South Bend, Ind., a corporation of Delaware Application March 5, 1931, Serial No. 520,282

11 Claims. (Cl. 192—48)

This invention relates to new and useful improvements in free wheeling transmissions specially adapted for use in motor vehicles.

The primary object of the invention is to provide a variable speed transmission having means incorporated therein for permitting or preventing, at the will of the operator, the driven or transmission shaft to overrun with respect to the engine or driving shaft whereby a vehicle equipped with the same may be permitted to free wheel.

A further object of the invention is to provide a variable speed transmission mechanism having incorporated in one or more of its various speed drives an overrunning clutch structure which will permit the driven shaft of the transmission to overrun with respect to the drive shaft.

A still further object of the invention is to provide novel means for preventing operation of an overrunning clutch structure incorporated in one or more of the different speed drives, said means being of exceedingly simple construction and one which will function to perform its intended work without the liability of becoming out of order due to excessive wear, gumming or sticking of relatively movable parts, and the like.

Other objects and advantages of the invention will be apparent during the course of the following description:

In the accompanying drawings forming a part of this specification and in which like numerals are employed to designate like parts throughout the same, Figure 1 is a longitudinal vertical section of a variable speed transmission embodying this invention.

Figure 2 is a detail longitudinal sectional view of one unitary portion of the transmission illustrated in Figure 1 and embodying the overrunning or free wheeling mechanism of the transmission.

Figure 3 is a detail transverse sectional view taken on line 3—3 of Figure 2.

Figure 4 is a detail transverse sectional view taken on line 4—4 of Figure 2.

Figures 1, 5:
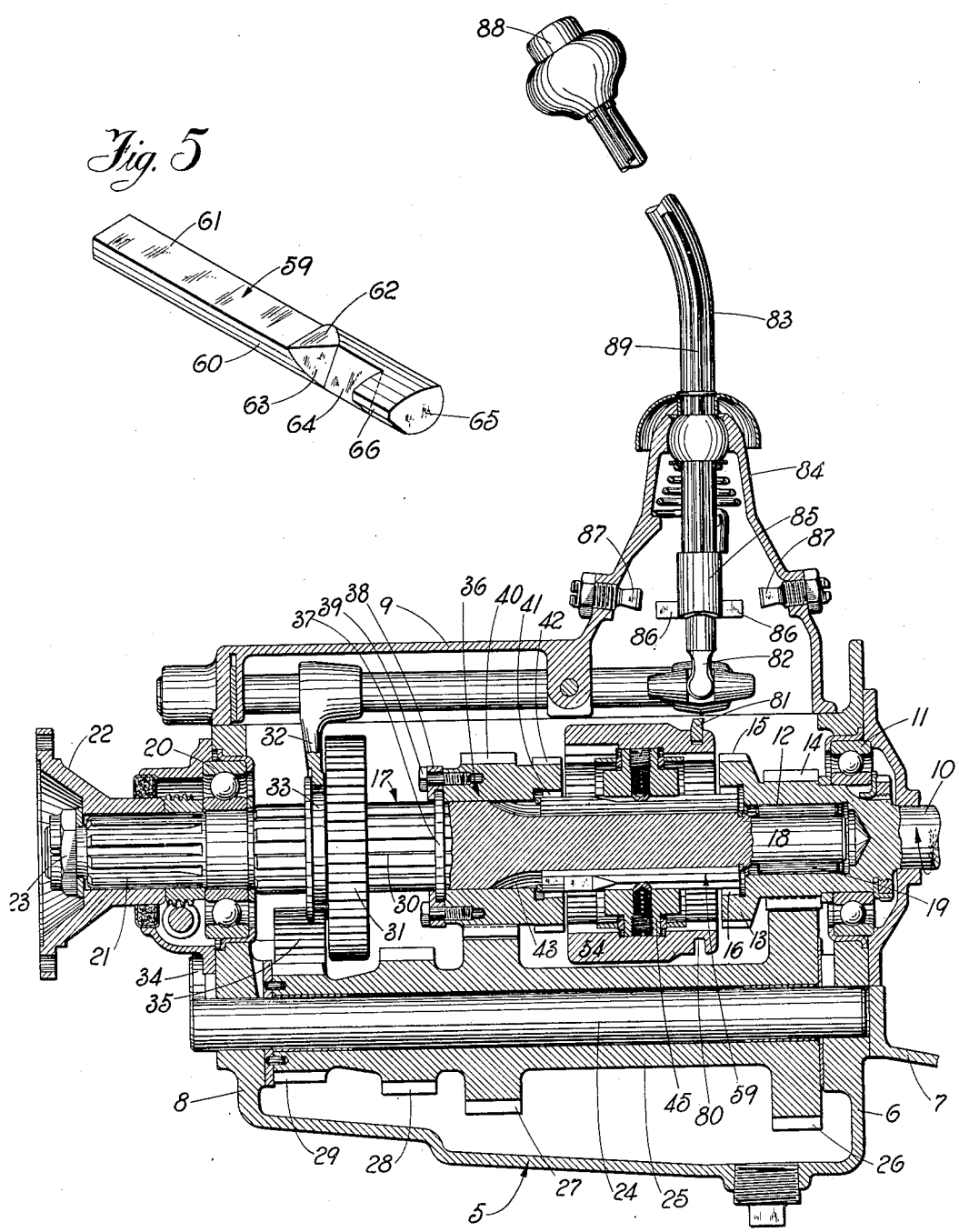
Figure 5 is a detail perspective view of a key element incorporated in the overrunning or free wheeling mechanism illustrated in detail in the previous figures.

In the drawings, wherein for the purpose of illustration is shown a preferred embodiment of this invention, the numeral 5 designates in its entirety a transmission housing which has an end wall 6 cooperatively associated with a clutch housing, or the like, 7 which is partially illustrated in Figure 1. The transmission housing 5 is provided with a second end wall 8 and is closed at its top by a cover plate 9.

Projecting into the transmission housing 5 through the end wall 6 and from the interior of the clutch housing 7 is a drive shaft 10 which is supported substantially within the plane of the end wall 6 by an anti-friction bearing structure 11. This bearing structure is illustrated as being of the ball and race type. It is to be understood, however, that any suitable form of anti-friction bearing structure may be employed. The portion of the drive shaft 10 which is located within the transmission housing 5 is bored or hollowed out to form a bearing portion 12 and a clutch portion 13. The clutch portion is of greater diameter than the bearing portion. Gear teeth 14 are formed exteriorly on the portion of the drive shaft having the bearing 12 formed therein. The clutch portion 13 of the shaft has formed exteriorly thereon a set of clutch teeth 15, while the interior of the portion 13 is provided with a set of clutch teeth 16.

A driven shaft 17 projects through the end wall 8 of the transmission casing 5 and has its extreme inner end 18 reduced in diameter and supported by means of the anti-friction bearing structure 19 within the bearing portion 12 of the drive shaft. Adjacent the outer end of the driven shaft 17, and located substantially in the plane of the end wall 8 of the casing 5, an anti-friction bearing structure 20 is provided for supporting the driven shaft.

The outwardly projecting extremity of this shaft is splined at 21 for connection with a transmission collar or flange 22 which, in the illustrated form of the invention, is adapted to form a part of a universal joint or the like. The collar or flange 22 is retained in place by means of a nut 23 threaded on the end of the driven shaft 17.

A fixed countershaft 24 is supported at its ends in the end walls 6 and 8 of the transmission casing. Rotatably journaled on this countershaft 24 is a sleeve 25 which has formed integrally therewith the four sets of gear teeth 26, 27, 28 and 29, respectively. These gear members 26 to 29 inclusive progressively decrease in diameter and are provided with a progressively smaller number of teeth.

The driven shaft 17 is formed with a splined portion 30 upon which is axially slidably positioned a gear 31. This gear is adapted to be shifted into two operative positions by the fork 32 which engages a shifter groove 33 carried by the gear 31. An idler shaft 34 is suitably supported in the transmission casing and carries a pinion 35.

A sleeve 36 is rotatably mounted upon the driven shaft 17 and is retained against axial movement with respect thereto by means of a retaining structure including a ring 37 keyed into the driven shaft and a detachable clamping ring 38 connected to the sleeve 36 by means of bolts or the like 39. This sleeve 36 is formed with an external set of teeth 40 located intermediate its ends, an internal set of clutch teeth 41 located at one end, and an external set of clutch teeth 42 positioned in transverse or radial alignment with the internal teeth 41.

This transmission is especially designed for three forward speeds and one reverse speed. First or low speed is accomplished by shifting the gear 31 into mesh with the teeth 28 formed on the rotatable counter sleeve 25. The drive then will be from the drive shaft 10 through the meshing teeth 14 and 26 carried by the drive shaft 10 and the counter sleeve 25 respectively. Rotation of the counter sleeve will be transmitted to the driven shaft due to the meshing of the teeth 28 with the teeth of the gear 31 splined to the driven shaft. The reverse drive is accomplished by shifting the gear 31 into mesh with the idler pinion 35 which constantly meshes with the gear teeth 29 on the sleeve 25. The drive then will be from the drive shaft 10 through the gear elements 14 and 26 to the counter sleeve 25 and from this sleeve through the gear 29 to the idler pinion 35 and from this pinion to the gear 31 which is rotatively connected with the driven shaft. Intermediate or second speed is accomplished by shifting the gear 31 into its inoperative or neutral position, shown in Figure 1, and then intermeshing the clutch teeth 74 on the member 54 with the clutch teeth 42 on the sleeve 36, as shown in Figure 2, thereby connecting the sleeve 36 to the driven shaft by means of the unitary structure, disclosed in detail in the various figures, which will permit the driven shaft 17 to overrun or free wheel with respect to the drive shaft under the control of the operator so that this overrunning or free wheeling may be dispensed with when desired. The drive in the second or intermediate speed will be from the drive shaft 10 through the meshing gears 14 and 26 to the counter sleeve 25 and from the gear 27 on this sleeve to the gear 40 and then through the overrunning or free wheeling unit. For third or high speed, the overrunning or free wheeling unit is shifted to connect the drive shaft directly with the driven shaft and will permit the driven shaft to overrun with respect to the drive shaft or will prevent said overrunning at the will of the operator.

The overrunning or free wheeling unit now will be described in detail:

The driven shaft 17 between the position occupied by the free sleeve 36 and the portion journaled in the inner end of the drive shaft 10; namely, the reduced end 18 of the driven shaft, is provided with a plurality of longitudinally extending, half-round grooves 43 shown in detail in Figures 2 to 4 inclusive. In the present embodiment of the invention, there are four of these grooves provided. Figure 3 is taken on the section line 3—3 of Figure 2 and discloses substantially the intermediate portion of this grooved part of the driven shaft. It will be noted from Figure 3 that the periphery of the driven shaft at this location is formed with four longitudinally extending ribs 44. A cam member 45 is formed with four grooves 46 which slidably receive the ribs 44 formed on the driven shaft. This cam member is provided with four camming surfaces 47 which are separated from each other by radial abutments 48. These abutments are located in radial alignment with the four half-round grooves 43 formed on the driven shaft. Each cam surface 47 has associated therewith a roller 49 which is backed up by a follower 50 spring pressed longitudinally of its cam surface by the spring 51 which is seated at its opposite ends in the pockets 52 and 53 formed respectively in its abutment 48 and its follower block 50. The camming member 45 is received within a shifter collar 54 which is formed intermediate its ends with a circular bore 55 positioned to radially register with the cam member 45. This circular portion bridges or closes the outer sides of the cam surfaces 47 and cooperates with the surfaces to form tapered pockets gradually diminishing in depth from end to end. The cam member 45 is retained in place by means of split rings 56 pocketed in grooves 57 formed in the bore of the collar 54. Interposed between the rings 56 and the cam member 45 are additional split rings 58.

Each one of the half-round grooves 43 formed in the driven shaft 17 is provided with a key 59. All of these keys are of the same construction and one of them is illustrated in detail in Figure 5. A description of this one key, therefore, will be sufficient for all. The key disclosed in Figure 5 is of elongated formation and is rounded on one side which will be designated by the reference character 60. Extending longitudinally of the key, for slightly more than half of its length, is a flat portion 61 which is diametrically arranged with respect to the rounded surface 60. Adjacent the flat surface 61 is an inclined camming surface 62 which extends transversely of the key for substantially its entire width. Beyond this camming surface the key is formed with a second camming surface 63 which merges into the surface 62 and into a second flat surface 64 which is formed on a plane extending longitudinally of the key and arranged at an angle to the longitudinal plane corresponding with the flat surface 61. Between the flat surface 64 and the extremity 65 of the key, a tooth 66 is formed.

The four keys employed are positioned in the four grooves 43 with two of the teeth 66 positioned at one end of the set of grooves 43 and with the remaining two teeth 66 positioned at the other end of the grooves. It will be noted, particularly by inspecting Figure 2, that diametrically opposite keys have their teeth 66 arranged at the same end of the grooves with the result that diametrically opposite teeth will function simultaneously. Figure 2 discloses two split rings 67 and 68 respectively which are carried by the driven shaft 17 and function to retain the keys against longitudinal movement but not preventing the keys from having angular or rotary movement.

In Figures 1, 2 and 3, the abutments 48 are illustrated as being formed with radial holes 69 within which are slidably positioned plungers 70. These plungers are retained with their inner ends projecting into the half-round grooves 43 by means of the springs 71 adjustably retained within the holes by set screws 72. The inner ends of the plungers 70 therefore bear against the various keys 59, one plunger being provided for each key.

By inspecting Figures 1, 2 and 4, it will be seen that the collar 54 is formed at its opposite ends with internal clutch teeth 73 and 74 respectively.

The teeth 73 are formed at the end of the collar 54 adjacent the drive shaft 10 while the clutch teeth 74 are formed on the opposite end of the collar 54 and adjacent the loose gear 40. When it is desired to drive in second or intermediate speed, the collar 54 is shifted longitudinally of the driven shaft and toward the gear 40. This shifting movement is continued until the clutch teeth 74 interlock with the clutch teeth 42 formed on the collar 36 carrying the teeth 40. The movement of the collar 54 ceases after the teeth 74 and 42 have been meshed or interlocked sufficiently to produce a driving connection between the collar 54 and the sleeve 36. The drive then will be from the drive shaft 10 through the gear 14 to the gear 26 which will cause rotation of the counter sleeve 25. Rotation of the sleeve 25 will be transmitted to the sleeve 36 by means of the gears 27 and 40. The connection between the sleeve 36 and the collar 54 through the meshing clutch teeth 42 and 74 will cause the collar 54 to rotate in the direction of the arrows shown in Figures 3 and 4. This rotation of the collar 54 will cause the various rollers 49 to travel longitudinally of their cam surfaces 47 until the rollers are wedged between the cam surfaces and the collar. The cam member 45 then will be driven with the collar 54, and the driven shaft, due to the rib and groove connections 44 and 46, will be driven with the cam member 45. If for any reason the driven shaft 17 is forced to rotate at a higher rate of speed than the speed at which it is being driven by the drive shaft, as for instance, when a vehicle equipped with this transmission starts under its own momentum to travel at a higher rate of speed than the speed at which it is being driven by the engine, the driven shaft will exert a rotating force on the cam member 45 which will shift the cam member relative to the rollers 49 and cause the rollers to travel longitudinally of the cam surfaces against the tension of the springs 51. The driven shaft then will be permitted to rotate free of the collar 54 and its connection with the gear 40 which remains in driving connection with the drive shaft.

When it becomes desirable to prevent this overrunning or free wheeling in second speed, the collar 54 is shifted longitudinally to a greater extent. The plungers 70, during the free wheeling or overrunning position of the collar 54 for this second or intermediate speed drive still remain in engagement with the flat surfaces 61 of the keys 59. When the collar 54 is moved to prevent free wheeling in second speed, the plungers 70 associated with the keys having their teeth 66 positioned within the sleeve 36 will ride up on the camming surfaces 62 of the keys and will move beyond these camming surfaces until they engage the flat surfaces 64. Due to the fact that these flat surfaces are located on planes extending at angles to the flat surfaces 61, the force of the plungers 70 will cause the keys 59 to be angularly moved or rotated until the surfaces 64 are normal to or at right angles with respect to the axes of the plungers. This angular or rotary movement of the two keys being effected by the movement of the collar 54 will cause the teeth 66 to be thrown into driving engagement with the clutch teeth 41. This position of the teeth 66 is illustrated in Figure 4. It now will be seen that the gear 40 is locked against relative rotation with respect to the driven shaft 17 and this latter shaft will not be permitted to overrun or free wheel with respect to the drive shaft.

When it is desired to drive in third or high speed, the collar 54 is shifted longitudinally of the driven shaft in the direction opposite to that described in connection with the intermediate or second speed drive. This movement of the collar 54 will cause the clutch teeth 73 formed on the collar to mesh with the clutch teeth 15 formed on the drive shaft 10. During this movement, the plungers 70 are each engaging the flat surface 61 of its respective key 59. The keys, therefore, are not caused to rotate. The drive then will be from the drive shaft through the intermeshing teeth 15 and 73 to the collar 54, and through the wedged rollers 49 to the cam member 45 which is directly connected to the driven shaft. With the collar 54 in this overrunning or free wheeling position, the driven shaft may rotate at a faster rate of speed, in the same direction, with respect to the drive shaft, for providing free wheeling.

When it is desired to dispense with free wheeling in high speed, the collar 54 is moved to a greater extent in the direction of the drive shaft, and the plungers 70 associated with the keys having their teeth 66 positioned within the clutch portion 13 of the drive shaft will cause these keys to rotate for shifting their teeth 66 into interlocking engagement with the teeth 16 formed on the drive shaft. The drive and driven shafts then will be locked against relative movement.

It will be noted that the control of this transmission consists solely in the movement of the gear 31 into mesh with the gear 28 or the idler pinion 35, and the movement of the collar 54 in opposite directions longitudinally of the driven shaft. It has been described that the gear 31 is shifted by the fork 32. The collar 54 is formed with an annular groove 80 adapted to receive the shifter fork 81. These forks 32 and 81 are connected in a conventional manner to the inner end 82 of the gear shift lever 83. This gear shift lever is mounted for universal movement in the hollow base 84 carried by the cover 9 of the transmission casing. It will be noted that a sleeve 85 is positioned on the lever 83 and has formed thereon diametrically projecting fingers 86 which normally register with stops 87 adjustably carried by the base 84. The fingers 86 engage the stops 87, when the gear shift lever 83 is moved in opposite directions longitudinally of the transmission for stopping the movement of the collar 54 in its two overrunning or free wheeling positions. The normal movement of the gear shift lever 83 for establishing intermediate or high speed drives, therefore, will establish these drives with the overrunning or free wheeling clutch structure operative. When it is desired to prevent overrunning or free wheeling in either of these two speeds, the push button 88 located at the upper end of the gear shift lever 83 is depressed for causing longitudinal movement of the rod 89 which is connected with the sleeve 85. This movement of the rod causes the sleeve to be moved longitudinally inwardly of the lever for placing the fingers 86 out of alignment with the stops 87. The lever 83 then can be moved sufficiently to actuate the keys 59 for locking the intermediate and high speed drives against overrunning or free wheeling action.

It is to be understood that the form of this invention herewith shown and described is to be taken as a preferred example of the same, and that various changes in the shape, size and arrangement of parts may be resorted to without departing from the spirit of the invention or the scope of the subjoined claims.

What I claim is:

1. In a transmission mechanism, the combination of a drive shaft, a driven shaft, means operating to drive said driven shaft in a given direction from said drive shaft and to automatically permit overrun of said driven shaft under the momentum of the latter, and means including a key held against longitudinal movement and rotatable by the longitudinal shifting of said first means to prevent overrun of said driven shaft relative to the drive shaft.

2. In a transmission mechanism, the combination of a drive shaft, a driven shaft, means associated with said driven shaft operating to drive the latter and automatically permit overrun thereof under its own momentum, and means including a key held against longitudinal movement in said driven shaft and rotatable by the longitudinal shifting of said first means to prevent overrun of said driven shaft relative to the drive shaft.

3. In a transmission mechanism, the combination of a drive shaft having a gear thereon, a driven shaft, means associated with said driven shaft engageable with said gear member operating to drive said driven shaft and permit overrun thereof under the momentum of the latter, and a key held against sliding movement in said driven shaft and rotatable, under the control of the operator, into engagement with said gear to prevent overrun of the driven shaft relative to said drive shaft.

4. In a transmission mechanism, the combination of a drive shaft, a driven shaft, a gear member rotatable relative to said driven shaft, and means associated with said driven shaft including said gear member operating to drive said driven shaft and permit overrun thereof under the momentum of the latter, and a key held against sliding movement in said driven shaft and rotatable relative thereto for movement into engagement with said gear member to prevent overrun of the driven shaft relative to said drive shaft.

5. In a transmission mechanism, the combination of a drive shaft having a gear member thereon, a driven shaft, means associated with said driven shaft engageable with said gear member operating to drive said driven shaft and to permit overrun thereof under its own momentum, and a key held against longitudinal movement and rotatable into engagement with said gear member, under the control of the operator, to prevent overrun of the driven member relative to said drive shaft.

6. In a transmission mechanism, the combination of a drive shaft, a driven shaft, said driven shaft having a key way formed therein, means associated with said driven shaft operating to drive the latter and permit overrun thereof under its own momentum, and a key seated in said key way adapted to be rotated therein by said means to effect a lock between said drive and driven shafts to prevent overrun of said driven shaft relative to the drive shaft, and means for preventing longitudinal movement of said key relative to the key way.

7. In a transmission mechanism, the combination of a drive shaft, a driven shaft, means associated with said driven shaft and longitudinally movable relative thereto operating to drive said driven shaft and permit overrun thereof under its own momentum, an operating lever for moving said means longitudinally, and a key unaffected upon initial movement of said operating lever and then rotatable upon further movement of the operating lever to prevent overrun of the driven shaft relative to said drive shaft.

8. In a transmission mechanism, the combination of a drive shaft, a driven shaft, an operating lever, means associated with the driven shaft movable longitudinally by said operating lever operating to drive said driven shaft and to permit overrun thereof under the momentum of the latter, and a key held against longitudinal movement with the aforementioned means but rotated by the longitudinal movement of said means to prevent overrun of the driven shaft relative to said drive shaft.

9. In a transmission mechanism, the combination of a drive shaft, a driven shaft, means associated with said driven shaft operating to drive the latter and permit overrun thereof under its own momentum, a key held against longitudinal movement, said means being initially movable longitudinally to effect said overrun, and spring actuated means for rotating said key on further longitudinal movement of said means to prevent overrun of the driven shaft relative to the drive shaft.

10. In a transmission mechanism, the combination of a drive shaft, a driven shaft, a pair of spaced gear members rotatable relative to said driven shaft, means associated with said driven shaft movable into engagement with either of said gear members operating to drive the driven shaft and permit overrun under its own momentum, a plurality of keys held against longitudinal movement, and means for rotating certain of said keys into engagement with one or the other of said gear members after said first mentioned means has been moved to establish an overrun drive.

11. In a transmission mechanism, the combination of a drive shaft, a driven shaft, a pair of spaced members coaxial with said driven shaft rotatably connected with said drive shaft, means associated with said driven shaft operating to establish a one-way driving connection between said shafts, and a plurality of keys held against longitudinal movement relative to said driven shaft and selectively rotatable into engagement with either of said spaced members to establish a two-way driving connection between said shafts.

HARRY F. BUSHONG.